R. TESHER.
RUSSIAN TEA URN HEATER.
APPLICATION FILED APR. 23, 1918.
1,317,403.
Patented Sept. 30, 1919.
Fig. 1.
Fig. 2.
Fig. 3.
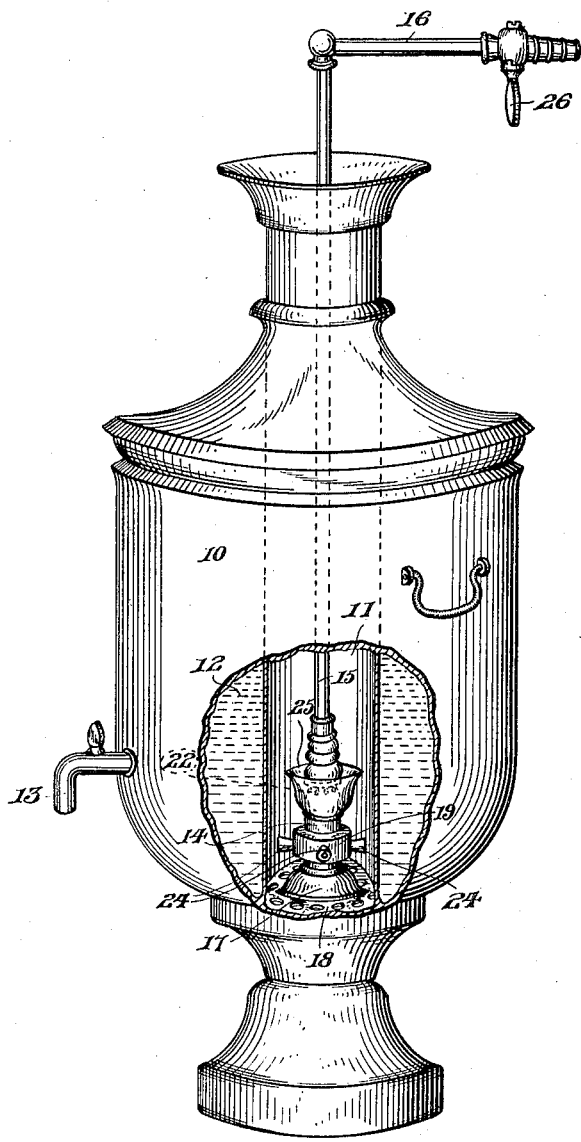
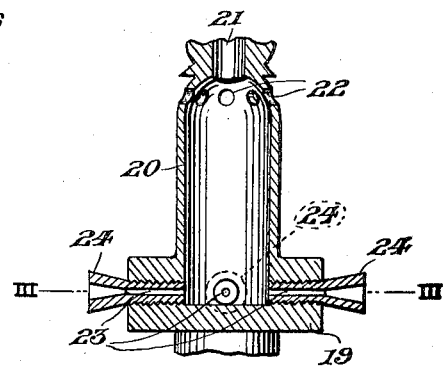
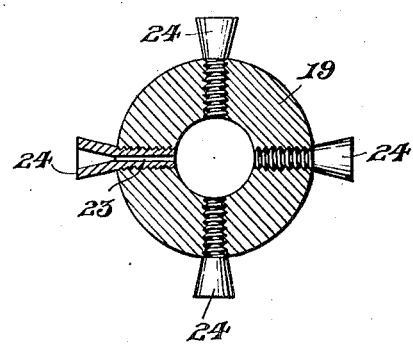
Witnesses
M. Elkinson
Wm Bogen
Inventor
Ruben Tesher
By Sigmund Honig
his Attorney ature of contained fluid, my invention be-
UNITED STATES PATENT OFFICE.

RUBEN TESHER, OF BROOKLYN, NEW YORK.

RUSSIAN TEA-URN HEATER.

1,317,403.   Specification of Letters Patent.   Patented Sept. 30, 1919.

Application filed April 23, 1918. Serial No. 230,217.

*To all whom it may concern:*

Be it known that I, RUBEN TESHER, a citizen of the United States, and resident of borough of Brooklyn, in the county of Kings and State of New York, have invented certain new and useful Improvement in Russian Tea-Urn Heaters, of which the following is a specification.

The primary object of the invention is the provision of a tea urn and the like arranged with means for readily heating the contents of the urn, the heating means being adapted for lighting when separated from the urn and readily positionable for use therein when desired.

A further object of the invention is to provide a gas heater for a tea urn or similar device in which it is desired to raise the temperature of contained fluid, my invention being readily moved from place to place as desired and provided with gas from any suitable source of supply.

A still further object of the invention is to provide a gas heater for a tea urn arranged for mixing air with the combustible gas prior to its ignition for heating purposes providing a structure producing intense heat and being of small size as well as simple in construction and easy to manufacture.

In the drawing forming a part of this application and in which like numerals refer to corresponding parts throughout the several views, Figure 1 is a perspective view of a tea urn partially broken away illustrating the manner of employing my device positioned therein for heating the urn;

Fig. 2 is an enlarged central longitudinal sectional view through my device showing the gas-outlets and air-inlets thereof; and Fig. 3 is a horizontal sectional view taken upon line 3—3 of Fig. 2.

Referring more in detail to the drawing, the tea urn 10 of substantially usual form is herein illustrated having a central tube 11 axially arranged therein adapted for receiving a heating member for heating the fluid 12 arranged within the urn around the tube while a spout 13 is provided for drawing off the heated fluid.

My burner 14 is rigidly attached upon the free end of a conducting pipe 15, the latter having a connection 16 adapted for attachment to a flexible gas-conducting hose, not shown, or similar means of supplying gas to the said pipe 15. The burner 14 comprises a base 17 for seating upon the perforated bottom 18 of the urn 10 at the lower end of the tube 11 while the body 19 of the burner which is mounted upon said base provides a mixing chamber 20 adapted to receive gas from the pipe 15 secured in the upper reduced end or bore 21 of the body.

Perforations 22 are arranged in the body 19 for admitting air into the chamber 20 while outwardly projecting burners or tubes 23 are radially carried by the body 19 communicating with the chamber 20 and having flaring outer ends 24 through which the mixed air and gas escape for lighting purposes.

A cup 25 is arranged upon the body 19 surrounding the portion thereof provided with the air-openings 22 so that the admission of air to the mixing chamber 20 is not affected by the burning of the mixture at the outer ends of the burner tubes 24. It will be understood that the burner 14 is readily lifted out of the urn 10 and that the supply of gas to the burner is controlled by a valve 26 arranged in the connection 16. The air and gas mixture within the chamber 20 is lighted as it escapes through the ends 24 of the burner tubes 23 and being so lighted when the burner is outside of the urn 10 the burner is readily positioned within the urn as shown in Fig. 1 of the drawing where the heat from the burner quickly heats the fluid 10 within the urn. It will be understood that the temperature of such fluid 12, such as heat, may be controlled by regulating the supply of gas to the burner 14 by means of the valve 26. The device may be easily and quickly operated and provides only a few parts which are unlikely to get out of repair.

What I claim as new is:—

1. A burner comprising a body having a mixing chamber therein and provided with air inlet openings therethrough communicating with the chamber, a comparatively long gas supply pipe connected to the upper end of said body, burner tubes projecting radially from the body and communicating with said mixing chamber, a supporting base upon said body beneath the burner tubes, a protecting cup surrounding the perforated portion of the body, and controlling means for the burner carried by the gas supply pipe.

2. A burner including a supporting base, a body mounted upon said base having an air and gas mixing chamber therein and provided with air inlet openings therethrough, burner tubes projecting radially from the body beneath the air inlets and communicating with said chamber, said burner tubes having flaring outer ends through which the mixture from the chamber is adapted to escape, a protecting cup upon the body surrounding the air inlets thereof, a comparatively long gas supply pipe attached to the upper end of the body and communicating with said chamber, and a valved hose connector carried by said pipe.

3. A burner comprising a body having a mixing chamber therein and provided with air inlet openings therethrough communicating with the chamber, burner tubes projecting from the body and communicating with the mixing chamber, a gas supply pipe attached to the upper end of the body and communicating with said chamber and a valved hose connector carried by said pipe.

Signed at the city of New York, in the county of New York and State of New York, this 17th day of April, A. D. 1918.

RUBEN TESHER.

Witnesses:
M. EBINSON,
M. SCHUMANN.

Copies of this patent may be obtained for five cents each, by addressing the "Commissioner of Patents, Washington, D. C."